United States Patent
Mead et al.

(10) Patent No.: US 11,830,368 B2
(45) Date of Patent: Nov. 28, 2023

(54) HORIZONTAL EVASION GUIDANCE DISPLAY METHODS AND SYSTEMS

(71) Applicant: HONEYWELL INTERNATIONAL INC., Morris Plains, NJ (US)

(72) Inventors: Michael Mead, Phoenix, AZ (US); Rodney Kennan, Phoenix, AZ (US); James Alexander Nicholls, Phoenix, AZ (US); Gregory Carlucci, Phoenix, AZ (US); Erik A. Ringnes, Phoenix, AZ (US); Victor Files Tarbutton, Jr., Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 457 days.

(21) Appl. No.: 17/007,380

(22) Filed: Aug. 31, 2020

(65) Prior Publication Data
US 2022/0068146 A1 Mar. 3, 2022

(51) Int. Cl.
G08G 5/00 (2006.01)
G01C 23/00 (2006.01)
G08G 5/04 (2006.01)

(52) U.S. Cl.
CPC ......... *G08G 5/0021* (2013.01); *G01C 23/005* (2013.01); *G08G 5/006* (2013.01); *G08G 5/045* (2013.01)

(58) Field of Classification Search
CPC ...... G08G 5/0021; G08G 5/006; G08G 5/045; G08G 5/0039; G01C 23/005
See application file for complete search history.

(56) References Cited

U.S. PATENT DOCUMENTS

| | | |
|---|---|---|
| 6,690,299 B1 | 2/2004 | Suiter |
| 7,508,322 B1 | 3/2009 | Krenz et al. |
| 7,961,135 B2 | 6/2011 | Smith et al. |
| 8,624,757 B2 | 1/2014 | Schrauben |
| 9,108,741 B2 | 8/2015 | Nicholls et al. |
| 9,440,747 B1 | 9/2016 | Welsh et al. |
| 2010/0039310 A1 | 2/2010 | Smith et al. |
| 2010/0309025 A1 | 12/2010 | Ganille et al. |
| 2015/0019048 A1 | 1/2015 | Krishna et al. |

FOREIGN PATENT DOCUMENTS

| | | | | |
|---|---|---|---|---|
| EP | 0704677 A1 * | 3/1996 | ............. | G01C 23/00 |
| EP | 0704677 A1 | 4/1996 | | |

* cited by examiner

*Primary Examiner* — Joseph H Feild
*Assistant Examiner* — Sharmin Akhter
(74) *Attorney, Agent, or Firm* — Lorenz & Kopf LLP (57) ABSTRACT

Methods and systems are provided for assisting vehicle operation for collision avoidance. One method involves determining a horizontal adjustment for the vehicle based at least in part on an output from a collision avoidance system and displaying, on a display device, a graphical indication of the horizontal adjustment at a position on the display device with respect to a reference position of a second graphical indication of a current orientation of the vehicle resulting in a distance between the position of the graphical indication and the reference position of the second graphical indication corresponding to the horizontal adjustment. The distance dynamically updates in response to changes to the orientation of the vehicle.

18 Claims, 8 Drawing Sheets

HORIZONTAL EVASION GUIDANCE DISPLAY METHODS AND SYSTEMS

TECHNICAL FIELD

The subject matter described herein relates generally to vehicle systems, and more particularly, embodiments of the subject matter relate to aircraft systems capable of presenting horizontal resolution advisory guidance.

BACKGROUND

Many modern aircraft are equipped with collision avoidance systems, such as an Airborne Collision Avoidance System (ACAS) or a Traffic Alert and Collision Avoidance System (TCAS). Such systems use a generally adopted standard for monitoring the space around a host aircraft and detecting neighbor traffic. When neighboring traffic enters (or is expected to enter) a buffer zone around the host aircraft, the collision avoidance system issues an alert that an evasive maneuver should be performed. For example, a Resolution Advisory (RA) is a TCAS alert that directs the pilots how to regulate or adjust their vertical situation so as to avoid a collision. To achieve the intended safety benefits, pilots must respond to the RAs; however, RAs often provide very little time to respond and tend to occur in an area of high cognitive demand, such as congested terminal areas. Accordingly, it is desirable to reduce the mental workload of the pilot (or air traffic controller, or the like) and provide improved situational awareness to facilitate expeditious execution of evasive maneuvers in potentially complex situations.

BRIEF SUMMARY

Methods and systems are provided for assisting operation of a vehicle, such as an aircraft. A method for displaying information on a display device associated with a vehicle involves determining a horizontal adjustment for the vehicle based at least in part on an output from a collision avoidance system and displaying a first graphical indication of the horizontal adjustment at a position on the display device with respect to a reference position of a second graphical indication of a current orientation of the vehicle. A distance between the position of the first graphical indication and the reference position of the second graphical indication corresponds to the horizontal adjustment. The distance dynamically updates in response to changes to the orientation of the vehicle.

In one or more embodiments, an apparatus for a flight deck display for an aircraft is provided. A primary flight display is rendered on the flight deck display and includes an aircraft reference symbol and a graphical indication of a target zone for the aircraft. The graphical indication of the target zone is offset from the aircraft reference symbol by a horizontal distance corresponding to a horizontal adjustment for the aircraft determined based at least in part on a relationship between a current heading of the aircraft and an output from a collision avoidance system.

In one or more embodiments, an aircraft system is provided that includes a display device having a primary flight display rendered thereon and a processing system coupled to the display device to determine a horizontal adjustment for an aircraft based at least in part on an output from a collision avoidance system and render a target zone indicative of the horizontal adjustment on the primary flight display, wherein a distance between a position of the target zone and a reference position of a reference symbol for the aircraft corresponds to the horizontal adjustment.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods for providing horizontal guidance for collision avoidance. While the subject matter described herein could be utilized in various applications or in the context of various types of vehicles (e.g., automobiles, marine vessels, trains, or the like), exemplary embodiments are described herein in the context of an aircraft. In particular, the subject matter is described primarily in the context of a piloted or manned aircraft, although it should be appreciated the subject matter can be implemented in an equivalent manner for unmanned aerial vehicles, urban air mobility vehicles, helicopters, rotorcraft, and the like.

As described in greater detail below in the context of FIGS. 2-8, the output from a collision avoidance system is analyzed to identify or otherwise determine a targeted horizontal adjustment to the position or orientation of the aircraft to execute the evasive maneuver indicated by the output of the collision avoidance system. A graphical indication of the targeted horizontal adjustment is displayed on a display device at a position relative to a reference graphical indication of a current orientation of the aircraft such that the on-screen distance between the graphical indicia corresponds to the targeted horizontal adjustment in the desired direction relative to the current aircraft orientation. For example, in one or more embodiments, the collision avoidance system outputs or otherwise provides a target heading for the aircraft to avoid a collision, with the horizontal adjustment being a roll adjustment determined based on the relationship between the target heading and the current aircraft heading. In this regard, the roll adjustment corresponds to the amount by which the aircraft needs to roll to reduce the difference between the target heading and the current aircraft heading and ultimately achieve the target heading from the current aircraft heading.

Figure 3:
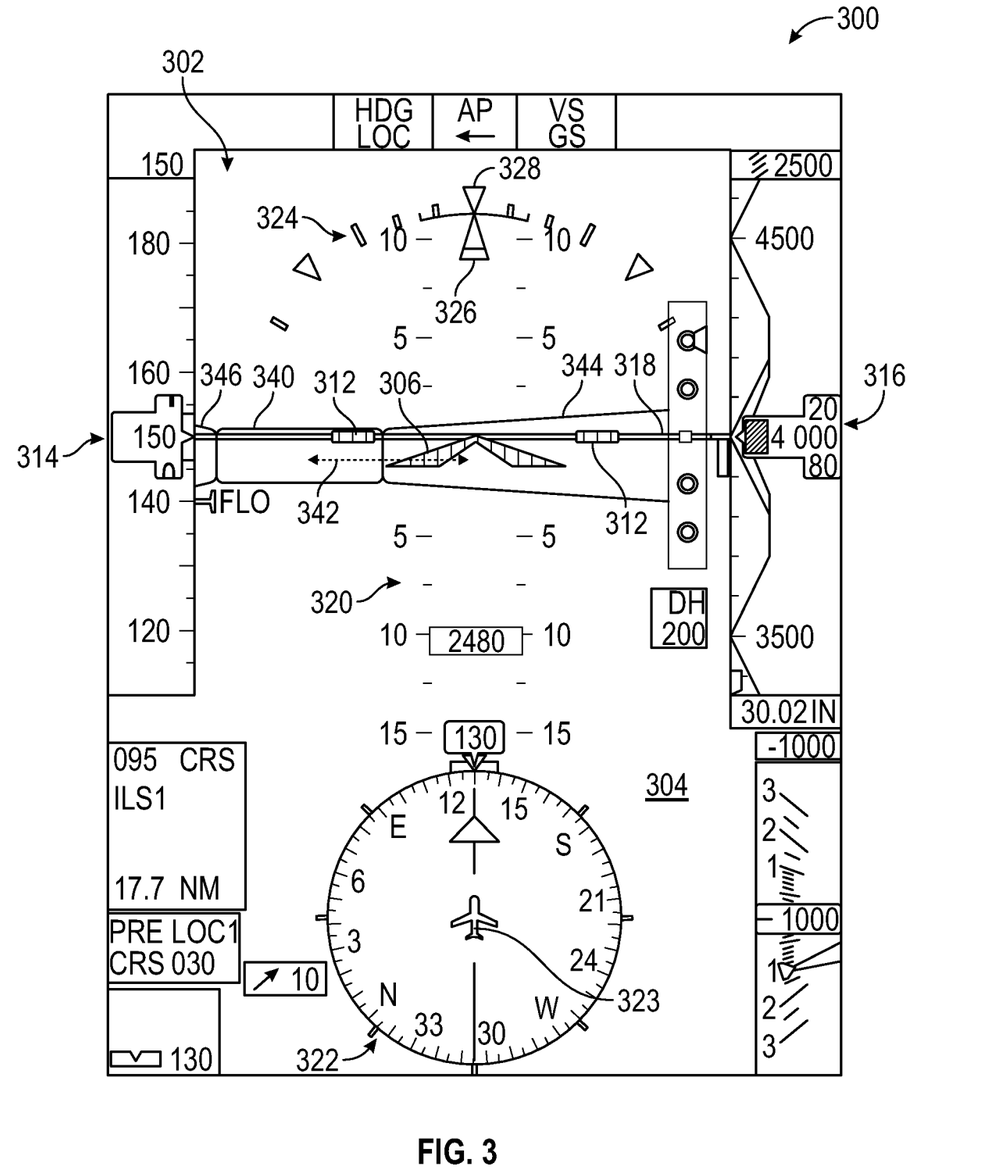
FIGS. 3-5 depict exemplary flight deck displays including evasion guidance on a primary flight display in connection with the evasion guidance display process of FIG. 2 in accordance with one or more embodiments.
Figure 4:
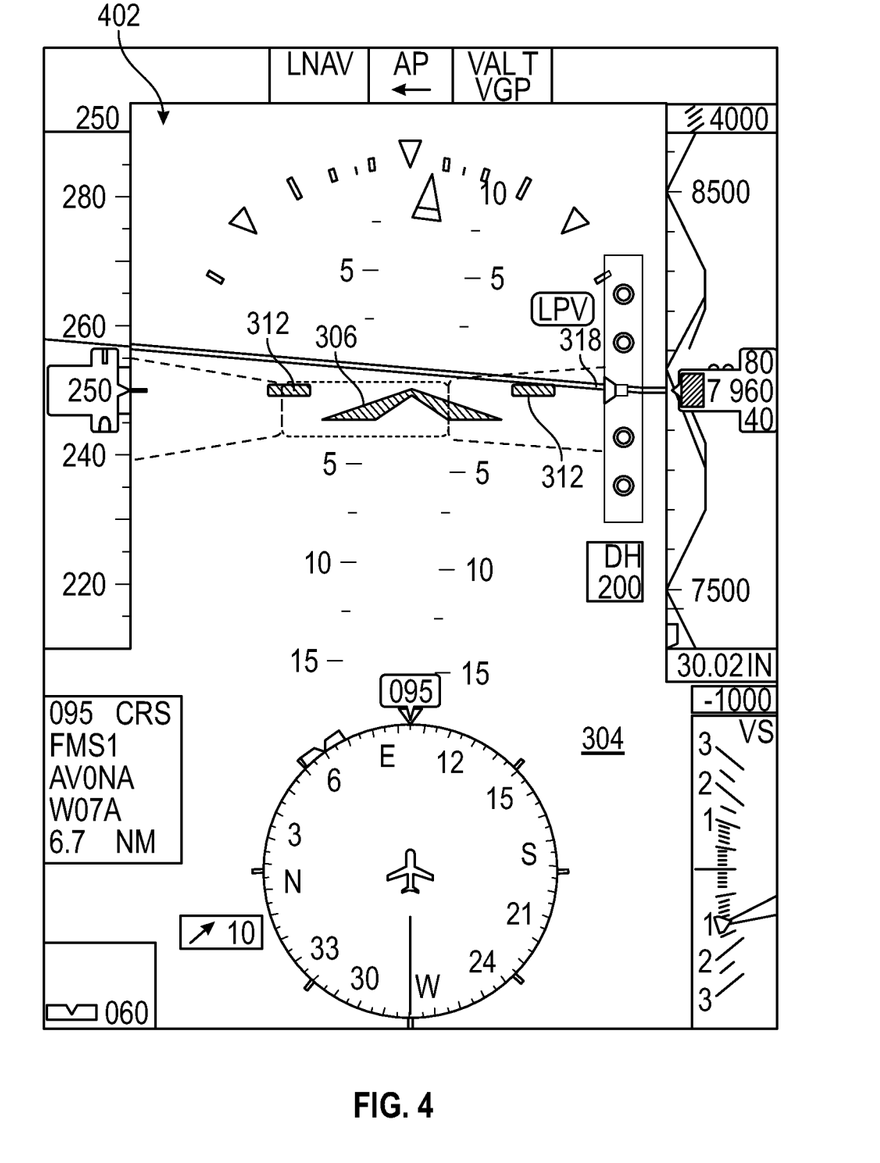
Figure 5:
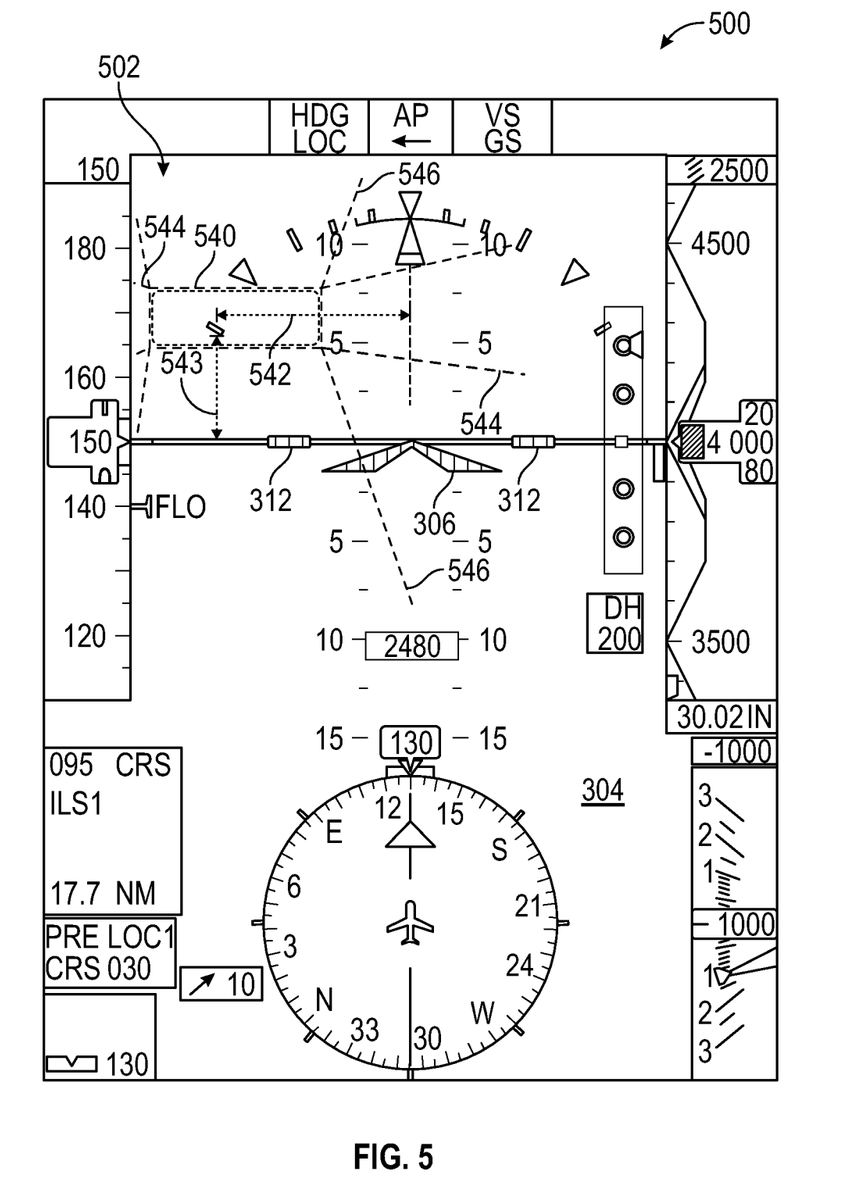

As depicted in FIGS. 3-5, in one or more embodiments, the graphical indication of the horizontal adjustment includes a target zone indicating a region where the aircraft should fly to (alternatively referred to herein as a fly-to zone) along with trapezoidal zone indicia emanating from the target zone horizontally to indicate one or more horizontal avoidance zones (alternatively referred to herein as a keep out zone). The target fly-to zone gives a pilot or other aircraft operator immediate guidance of where to fly the aircraft, with the horizontal keep out zone providing situational awareness of where the potential collision threat exists. Thus, by providing positive guidance of where to fly to in a way that does not clutter the display, expeditious execution of a horizontal resolution advisory may be achieved without delays associated with a pilot or other operator mentally analyzing the information to manually determine how to react and respond to the output from the collision avoidance system, that is, the pilot can aviate rather than navigate (per the aviate-navigate-communicate prioritization axiom).

In exemplary embodiments, the target fly-to zone symbology is presented on a primary flight display (PFD) or other forward-looking perspective view display at a position relative to the aircraft ownship symbology that results in the distance between the center of the target fly-to zone symbology and the center (or reference position) of the ownship symbol corresponding to the amount of the horizontal adjustment. In this regard, the target fly-to zone symbology may overlie a graphical representation of the terrain surrounding the aircraft at a position that corresponds to the spatial position of the target fly-to zone relative to the surrounding terrain. Additionally, in exemplary embodiments, graphical indicia of a vertical adjustment determined based on the output of the collision avoidance system is presented on the PFD in concert with the horizontal adjustment. For example, the center of the target fly-to zone symbology may be offset from the ownship symbol in a horizontal dimension by a distance that indicates the targeted amount of the horizontal adjustment for collision avoidance, while the center of the target fly-to zone symbology is offset from the ownship symbol in a vertical dimension by a second distance that indicates the targeted amount of the vertical adjustment. Similar to the horizontal guidance indicia, the vertical guidance indicia may include trapezoidal zone symbology emanating from the target zone vertically to indicate one or more vertical avoidance zones. In one or more embodiments, both the horizontal and vertical keep out zone symbology is realized using goal post symbology that converges at the target fly-to zone symbology on the PFD to emulate a forward-looking perspective view of the avoidance zones.

Figure 6:
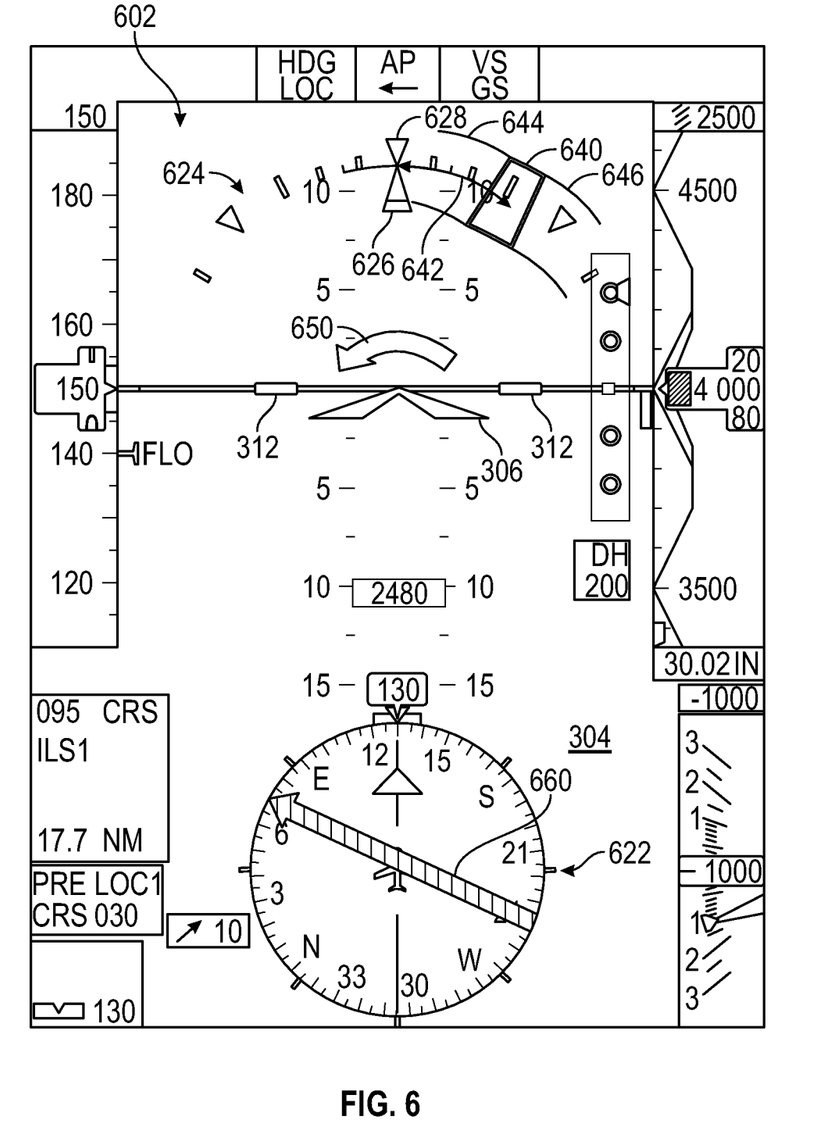
FIGS. 6-8 depict exemplary flight deck displays including evasion guidance on a roll scale of a primary flight display in connection with the evasion guidance display process of FIG. 2 in accordance with one or more embodiments.
Figure 7:
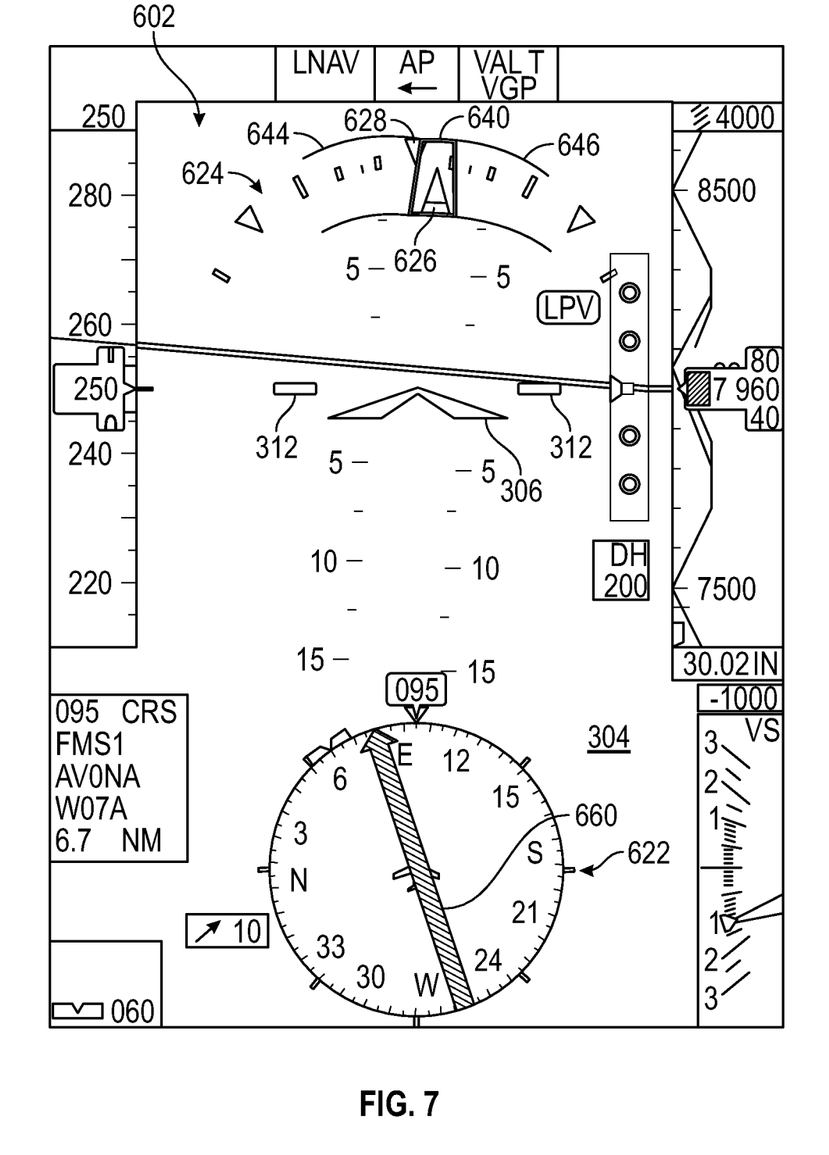
Figure 8:
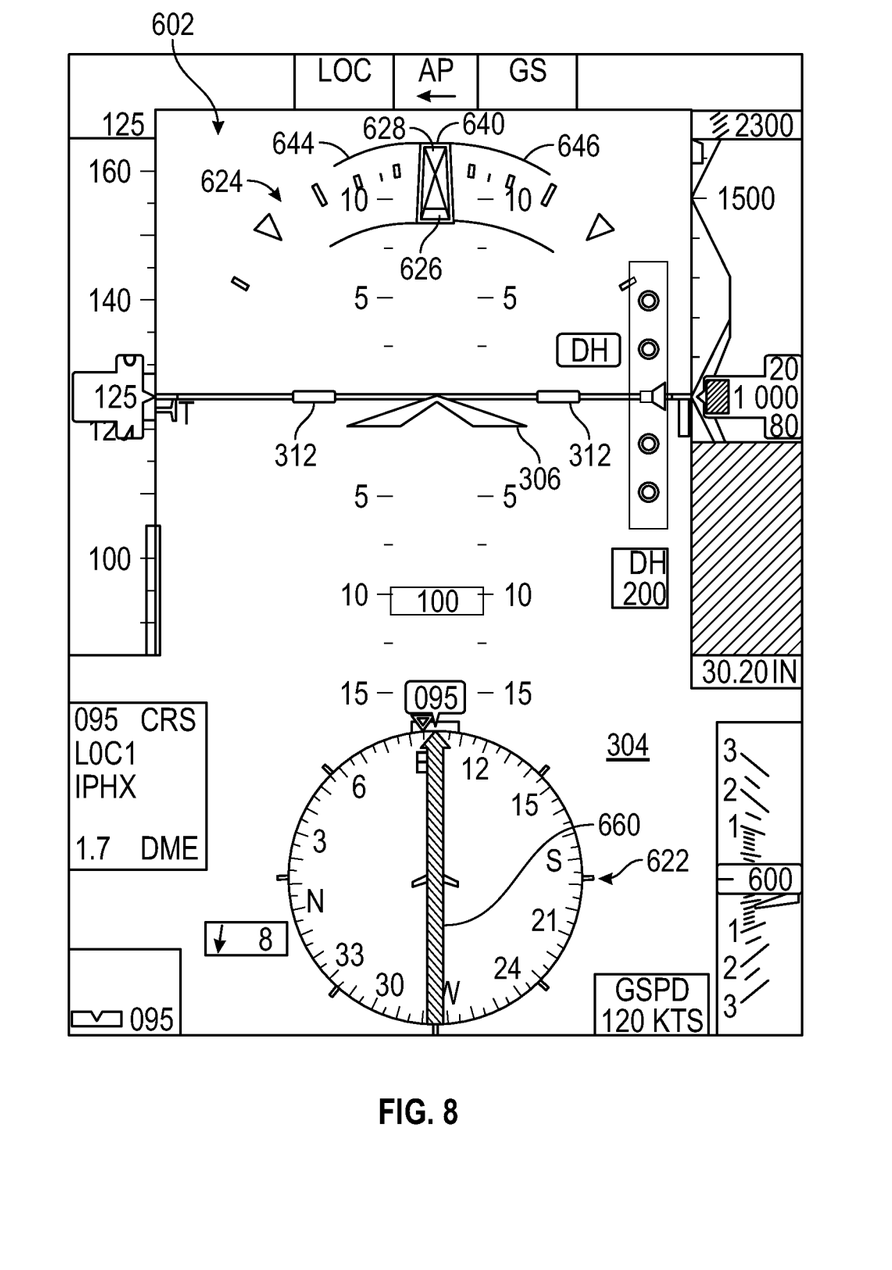

In some embodiments, a graphical indication of the horizontal adjustment is provided on a roll scale on the primary flight display to provide a graphical indication of the amount of roll required to achieve the target heading, as depicted in FIGS. 6-8. For example, a graphical indication of a target fly-to zone may be provided on the roll scale at a position relative to the roll scale that corresponds to the amount of roll required to achieve a target heading for collision avoidance. Thus, the distance between the target fly-to zone on the roll scale and the indicator of the current roll (or bank angle) of the aircraft measured with respect to the roll scale corresponds to the amount and direction of roll adjustment required to achieve the target heading for collision avoidance. In this regard, as the aircraft rolls towards the target heading, the position of the target fly-to zone with respect to the roll scale may dynamically update and progress towards the zero roll reference indicator on the roll scale to indicate when the aircraft may straighten out upon reaching the desired target heading.

Aircraft System Overview

Figure 1:
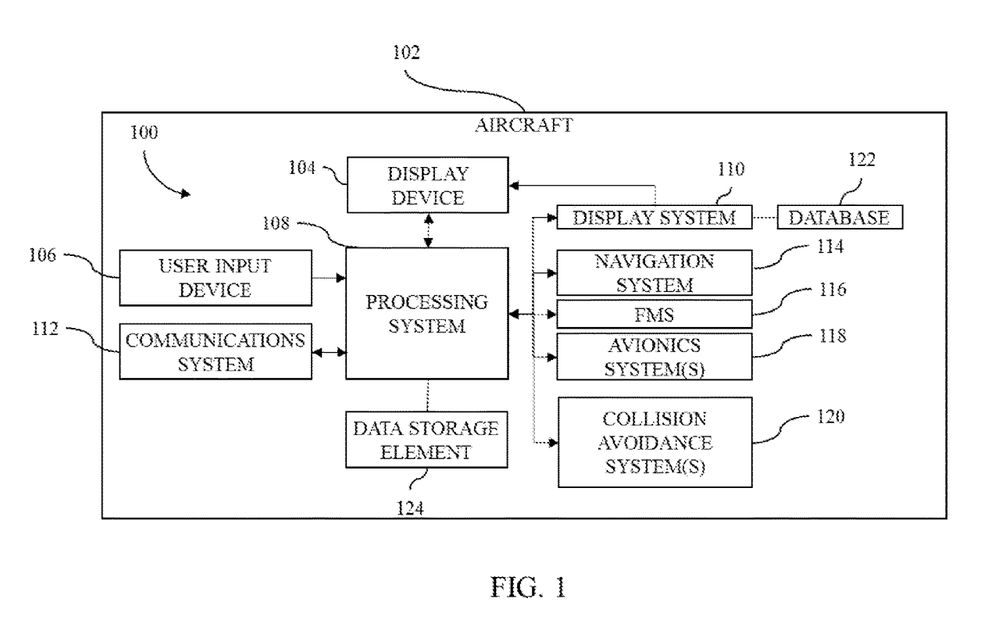
FIG. 1 is a block diagram of a system for an aircraft in an exemplary embodiment.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, a collision avoidance system 120, and one or more data storage elements 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, detection systems, an electronic flight bag and/or another suitable avionics system.

Still referring to FIG. 1, the collision avoidance system 120 generally represents the component(s) of the aircraft 102 that are coupled to one or more of the other onboard systems 108, 110, 112, 114, 116, 118 to detect incoming aircraft on a potentially conflicting flight path and generate or otherwise provide corresponding alerts to other onboard systems 108, 110, 112, 114, 116, 118. In this regard, the collision avoidance system 120 generally includes air traffic detection hardware, such as, for example, one or more antennas, transponders, interrogators, radar, and/or the like that support identification and detection of other aircraft within a vicinity of the aircraft 102 substantially in real-time. In some embodiments, the collision avoidance system 120 may also measure, sense, or otherwise detect obstacles, terrain and/or the like in the vicinity of the aircraft 102, while other embodiments may rely on a separate terrain avoidance system (e.g., a Terrain Awareness and Warning System (TAWS), an Enhanced Ground Proximity Warning System (EGPWS), or the like).

In addition to detection hardware to provide real-time detection data, in exemplary embodiments, the collision avoidance system 120 also includes collision avoidance hardware, firmware, processing logic and/or other components configured to analyze the detection data to identify or otherwise determine a recommended evasive maneuver (or resolution advisory) for the aircraft 102 to avoid a potential collision and output or otherwise provide indication of the recommended evasive maneuver to another onboard system 108, 110, 112, 114, 116, 118. For example, the collision avoidance system 120 may determine a recommended vertical speed at which the aircraft 102 should increase or decrease altitude to avoid a potential collision. Additionally, in exemplary embodiments described herein, the collision avoidance system 120 identifies or otherwise determines a recommended heading or bearing at which the aircraft 102 should increase or decrease altitude to avoid a potential collision. In one or more exemplary embodiments, the collision avoidance system 120 satisfies the Traffic Alert and Collision Avoidance System (TCAS) minimum operational performance standards (MOPS) promulgated by the Federal Aviation Administration (FAA) or other governmental or regulatory body. Various examples of a collision avoidance system 120 outputting or otherwise providing indication of a resolution advisory to another onboard system 108, 110, 112, 114, 116, 118 are described in greater detail in U.S. Patent Publication No. 2019/0189017.

In one or more embodiments, the collision avoidance system 120 generates or otherwise provides a recommended evasive maneuver (or resolution advisory) when a projected trajectory of the aircraft 102 intersects, or comes within a threshold distance of intersecting, a projected trajectory of another aircraft detected in a vicinity of the aircraft 102. For example, based on the current heading, location, altitude and/or speed of an intruder aircraft detected in the vicinity of the aircraft 102, the collision avoidance system 120 may calculate or otherwise determine a projected trajectory for the intruder aircraft. Similarly, the collision avoidance system 120 may utilize the current aircraft heading, location, altitude and/or speed to determine a projected trajectory for the ownship aircraft 102. When the projected trajectories intersect or come within a threshold distance of one another in advance of the current location of the aircraft 102, the collision avoidance system 120 may identify a potential collision threat and determine a horizontal and/or vertical adjustment for the ownship aircraft 102 that alters the projected ownship trajectory such that the projected trajectories do not come within a threshold distance of one another in advance of the current aircraft location. In this regard, in scenarios with a high volume of air traffic, the collision avoidance system 120 may recommend horizontal and/or vertical adjustments to avoid more than one potentially conflicting intruder trajectory. For example, if multiple potential threats exist at flight levels above and below the current flight level of the aircraft 102, the collision avoidance system 120 may recommend a horizontal evasive maneuver that resolves any potential collision threats at the current flight level of the aircraft 102 without climbing or descending.

In the illustrated embodiment, the processing system 108 is also coupled to the communications system 112, which is configured to support communications to and/or from the aircraft 102 via a communications network. For example, the communications system 112 may support communications between the aircraft 102 and one or more external monitoring systems, air traffic control, and/or another command center or ground location. In some embodiments, the communications system 112 may allow the aircraft 102 to receive collision avoidance information from another system that is external to the aircraft 102, such as, for example, from another neighboring aircraft, a ground-based system in a terminal area or other airspace the aircraft 102 is currently operating within, and/or the like. Thus, the subject matter described herein may be implemented in embodiments where a collision avoidance system may not be present onboard the aircraft 102 but reside at a remote or external location and communicate with the aircraft 102 via the communications system 112.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Horizontal Evasion Guidance

Referring now to FIGS. 2-8, in an exemplary embodiment, the aircraft system 100 is configured to support an evasion guidance display process 200 to display, present, or otherwise provide graphical indicia of a recommended evasive maneuver and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the evasion guidance display process 200 may be performed by different elements of the system 100, such as, the processing system 108, the display system 110, the communications system 112, the navigation system 114, the FMS 116, the onboard avionics system(s) 118 and/or the collision avoidance system 120. It should be appreciated that the evasion guidance display process 200 may include any number of additional or alternative tasks, the tasks need not be performed in the illustrated order and/or the tasks may be performed concurrently, and/or the evasion guidance display process 200 may be incorporated into a more comprehensive procedure or process having additional functionality not described in detail herein. Moreover, one or more of the tasks shown and described in the context of FIG. 2 could be omitted from a practical embodiment of the evasion guidance display process 200 as long as the intended overall functionality remains intact.

Figure 2:
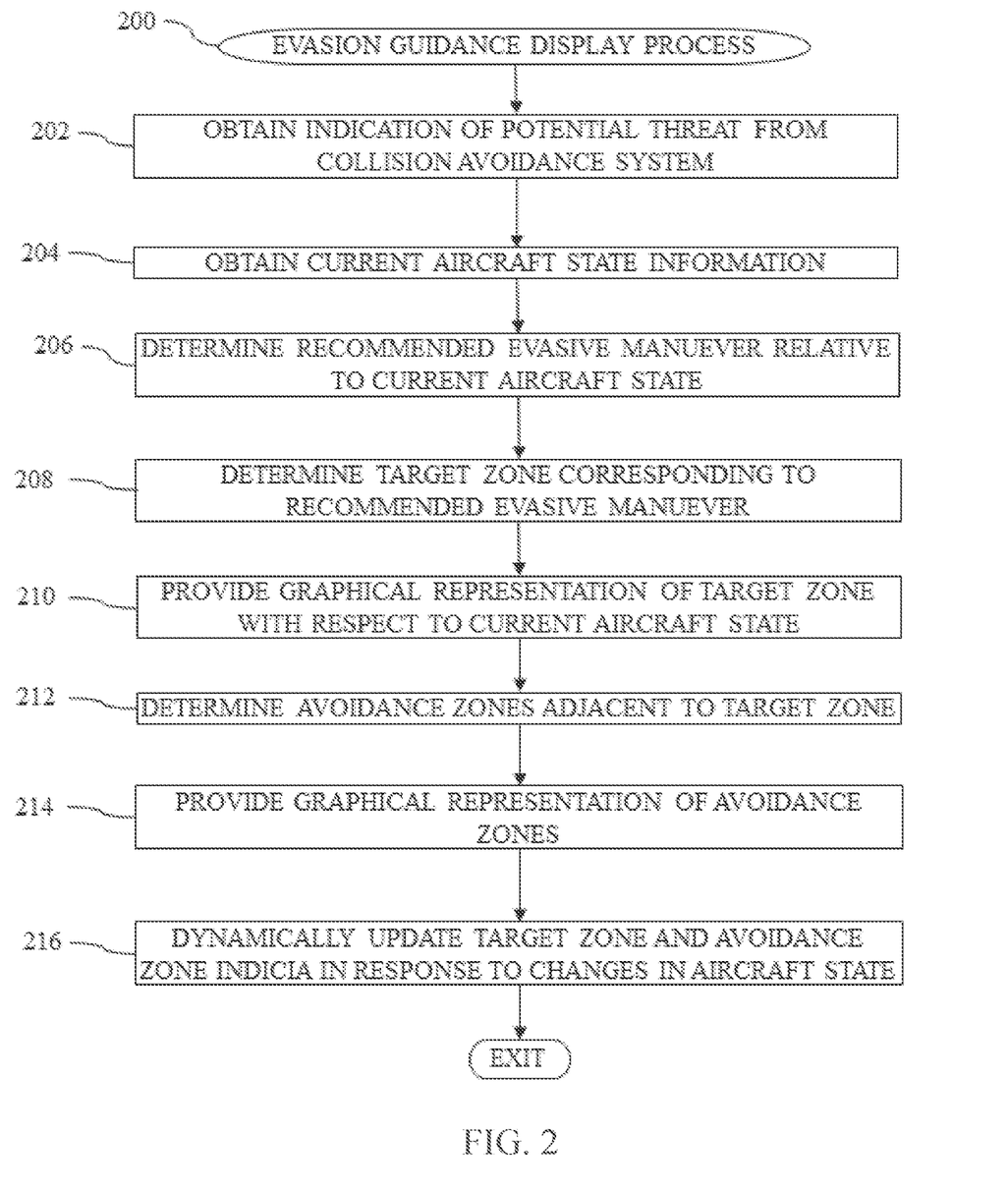
FIG. 2 is a flow diagram of an exemplary evasion guidance display process suitable for use with the aircraft in the system of FIG. 1 in accordance with one or more embodiments.

Still referring to FIG. 2, and with continued reference to FIG. 1, in an exemplary embodiment, the illustrated evasion guidance display process 200 begins by receiving or otherwise obtaining an output from a collision avoidance system indicative of a need for potential action to avoid a collision (task 202). For example, as described above, the collision avoidance system 120 generates or otherwise provides an alert or other output when a potential collision threat is detected within a vicinity of the aircraft 102. In one or more exemplary embodiments, the alert output by the collision avoidance system 120 is realized as a resolution advisory that indicates a recommended evasive maneuver for the aircraft 102 to execute to mitigate and resolve any potential collision threat(s). For example, a collision avoidance system 120 compliant with TCAS operational performance standards may output a resolution advisory that includes vertical guidance and/or horizontal guidance depending on the spatial relationships of the potential collision threat(s). The vertical guidance includes indicia of whether the aircraft 102 should ascend or descend in altitude, and if so, a recommended vertical speed for ascending or descending. The horizontal guidance includes indicia of a recommended heading or bearing for the aircraft 102 to travel along to mitigate the potential threat(s).

The evasion guidance display process 200 continues by receiving or otherwise obtaining information characterizing the current aircraft state and identifying or otherwise determining parameters for a recommended evasive maneuver from the current aircraft state (tasks 204, 206). For example, in response to receiving an output from the collision avoidance system 120, the processing system 108 obtains information from the navigation system 114 or another onboard system 116, 118 that defines the current position and orientation of the aircraft 102, such as, the current heading of the aircraft 102, the current altitude of the aircraft 102, the current speed of the aircraft 102, the current pitch angle of the aircraft 102, the current bank angle of the aircraft 102, and/or the like. Based on the relationship between the current aircraft state and the recommended evasive maneuver or other collision avoidance indicia output by the collision avoidance system 120, the processing system 108 calculates or otherwise determines corresponding horizontal and vertical adjustments for orientation of the aircraft 102 to achieve the recommended evasive maneuver. For example, based on the difference between the current aircraft heading and a recommended target heading output by the collision avoidance system 120 for a recommend horizontal evasive maneuver, the processing system 108 may calculate or otherwise determine a corresponding target roll angle (or commanded bank angle) for the aircraft 102 expected to achieve alignment with the recommended target heading within a threshold amount of time given the current aircraft speed. In this regard, the evasion guidance display process 200 may map the horizontal evasive maneuver information output by the collision avoidance system 120 into a roll target for achieving the desired horizontal evasive maneuver. In some embodiments, the evasion guidance display process 200 may limit the target roll angle to a maximum bank angle achievable by the aircraft 102 given the current speed of the aircraft 102 and other physical capabilities and/or limitations of the aircraft 102. In a similar manner, based on the current aircraft pitch and the current aircraft speed, the processing system 108 may calculate or otherwise determine a corresponding target pitch angle for the aircraft 102 expected to achieve the vertical ascent or descent speed target output by the collision avoidance system 120 for a recommend vertical evasive maneuver. Thus, the evasion guidance display process 200 may map the vertical evasive maneuver information output by the collision avoidance system 120 into a pitch target for achieving the desired vertical evasive maneuver.

Still referring to FIG. 2, in exemplary embodiments, the evasion guidance display process 200 identifies or otherwise determines a target zone for the aircraft to fly to that corresponds to the recommended evasive maneuver and generates or otherwise provides graphical indicia of the target zone on a display device (tasks 208, 210). The processing system 108 utilizes the roll and pitch targets to define a target zone for which the aircraft 102 should fly to in order to achieve the desired horizontal and vertical evasive maneuvers and mitigate the potential collision threat(s). The processing system 108 then generates or otherwise provides a graphical representation of the target zone on the display device 104 at a position such that the on-screen distance between the target zone and a graphical indicia of the current aircraft orientation corresponds to the amount and direction by which the aircraft orientation should be adjusted to achieve the recommended evasive maneuver.

In exemplary embodiments, the evasion guidance display process 200 also identifies or otherwise determines an avoidance zone for the aircraft to fly to that corresponds to the relative position of the potential collision threat(s) and generates or otherwise provides graphical indicia of the avoidance zone on the display device in concert with the target zone (tasks 212, 214). The avoidance zone graphically conveys a region of airspace to be avoided that emanates from the target zone in a direction that corresponds to the spatial relationship of the potential collision threat with respect to the target zone. Thus, a pilot viewing the display may quickly ascertain the region where the pilot should manually fly the aircraft 102 towards via the target zone, while also ascertaining the region that the pilot is attempting to avoid concurrently.

In exemplary embodiments, the evasion guidance display process 200 dynamically updates the positions of the target zone and the avoidance zone(s) on the display device as the aircraft travels to reflect changes to the aircraft state substantially in real-time (task 216). For example, as the aircraft 102 rolls towards the targeted heading for a horizontal evasive maneuver, the on-screen distance between the target zone and the aircraft reference indicia in a horizontal dimension may dynamically decrease as the difference between the current aircraft heading and the targeted heading decreases until reaching alignment with the aircraft reference indicia when the aircraft 102 reaches the targeted heading, thereby indicating to the pilot that the roll of the aircraft 102 can be reduced upon completion of the horizontal evasive maneuver. In a similar manner, as the aircraft 102 pitches up or down towards the targeted pitch for a vertical evasive maneuver, the on-screen distance between the target zone and the aircraft reference indicia in a vertical dimension may dynamically decrease as the difference between the current aircraft pitch and the targeted pitch decreases until reaching alignment with the aircraft reference indicia when the aircraft 102 reaches the targeted pitch for executing the vertical evasive maneuver. The dynamic nature of the relationship between the position of the target zone and the aircraft reference indicia allows a pilot to manually fly the aircraft 102 to a satisfactory level off or roll out without overshooting (or undershooting) the recommended evasive maneuver.

In exemplary embodiments, the target zone and the avoidance zone indicia are maintained on the display as long as the collision avoidance system 120 indicates there is a potential collision threat. For example, the collision avoidance system 120 may persistently output a recommended heading for the aircraft 102 until the collision thread has been avoided (e.g., both the ownship and intruder aircraft have flown past a location where the originally projected trajectories intersected or intruded upon one another). In this regard, when the aircraft 102 fails to execute the recommended evasive maneuver as quickly as possible, the distance between the target zone and the aircraft reference indicia may dynamically increase, horizontally and/or vertically, to provide guidance that the aircraft 102 needs to respond quicker or more urgently. Once a recommended evasive maneuver has been substantially achieved, the target zone indicia may persist on the display to indicate to the pilot to maintain the current heading until there is no longer a potential collision threat. Thus, once the target zone and avoidance zone indicia are removed from the display, the pilot is informed that the aircraft 102 can now be safely banked or flown at a different heading (e.g., to intercept a previously planned lateral trajectory, etc.).

Referring now to FIGS. 3-4, and with continued reference to FIGS. 1-2, in one or more exemplary embodiments, the processing system 108 and the display system 110 are cooperatively configured to control the rendering of a flight deck display 300 on the display device 104 and provide graphical indicia of a recommended evasive maneuver on the flight deck display 300. In exemplary embodiments, the flight deck display 300 includes a primary flight display 302 capable of being utilized by a pilot or other user for guidance with respect to manually flying the aircraft 102, that is, the pilot's primary reference for flight information (e.g., speed and altitude indicia, attitude indicia, lateral and vertical deviation indicia, mode annunciations, and the like). It should be appreciated that flight deck display 300 as depicted in FIG. 3 represents the state of a dynamic display frozen at one particular time, and that the flight deck display 300 may be continuously refreshed during operation as the aircraft 102 travels to reflect changes in the attitude, altitude and/or position of the aircraft 102 with respect to the earth. In this regard, the primary flight display 302 includes one or more graphical attitude indicia 318, 320, 324, 328 that convey the current attitude of the aircraft 102 based on the relationship between ownship symbology 312, 326 and the respective attitude indicia 318, 320, 324, 328.

In the illustrated embodiment, the primary flight display 302 includes several features that are graphically rendered, including, without limitation a perspective view of terrain 304, a reference symbol 312 (or ownship symbol) corresponding to the current flight path of the aircraft 102, an airspeed indicator 314 (or airspeed tape) that indicates the current airspeed of the aircraft 102, an altitude indicator 316 (or altimeter tape) that indicates the current altitude of the aircraft 102, a zero pitch reference line 318, a pitch ladder scale 320, a compass 322, a roll scale 324, and an aircraft reference symbol 306, as described in greater detail below. The embodiment shown in FIG. 3 has been simplified for ease of description and clarity of illustration—in practice, embodiments of the primary flight display 302 may also contain additional graphical elements corresponding to or representing pilot guidance elements, waypoint markers, flight plan indicia, flight data, numerical information, trend data, and the like. For the sake of clarity, simplicity, and brevity, the additional graphical elements of the primary flight display 302 will not be described herein.

In some embodiments, the terrain 304 is based on a set of terrain data that corresponds to a viewing region proximate the current location of aircraft 102 that corresponds to the forward-looking cockpit viewpoint from the aircraft 102. As described above, the processing system 108 and/or the display system 110 includes or otherwise accesses a terrain database 122, and in conjunction with navigational information (e.g., latitude, longitude, and altitude) and orientation information (e.g., aircraft pitch, roll, heading, and yaw) from one or more onboard avionics systems 112, 114, 116, 118, the processing system 108 and/or the display system 110 controls the rendering of the terrain 304 on the display device 104 and updates the set of terrain data being used for rendering as needed as the aircraft 102 travels. In this regard, in some embodiments, the processing system 108 and/or the display system 110 renders the terrain 304 in a perspective or three dimensional view that corresponds to a flight deck (or cockpit) viewpoint. In other words, terrain 304 may be displayed in a graphical manner that simulates the flight deck viewpoint, that is, the vantage point of a person in the cockpit of the aircraft (e.g., a line of sight aligned with a longitudinal axis of the aircraft). Thus, features of terrain 304 may be displayed in a conformal manner, relative to the earth. For example, the relative elevations and altitudes of features in terrain 304 can be displayed in a virtual manner that emulates reality. Moreover, as the aircraft 102 navigates (e.g., turns, ascends, descends, rolls, etc.), the graphical representation of terrain 304 and other features of the perspective display can shift to provide a continuously updated virtual representation for the flight crew that reflects the current state of the aircraft 102 with respect to the earth while the position and orientation of the aircraft reference symbol 306 is maintained fixed. It should be appreciated that the perspective view associated with primary flight display 302 need not always include a perspective view of terrain 304. For example, in the absence of terrain data, the perspective view of the display may appear flat, blank, or otherwise void of conformal terrain graphics. In other embodiments, the display device 104 may be realized as a head-up display (HUD) where the primary flight display 302 is rendered on the HUD to appear in the foreground overlying the surrounding real-world environment.

As illustrated in FIG. 3, the flight path reference symbol 312, the airspeed indicator 314, the altitude indicator 316, the zero pitch reference line 318, the pitch ladder scale 320, the compass 322, the roll scale 324, and the aircraft reference symbol 306 are displayed or otherwise rendered overlying the terrain 304. During flight, the flight path reference symbol 312 moves within primary flight display 302 such that it generally indicates the direction the aircraft 102 is currently moving. The pitch ladder scale 320 includes a number of parallel marks and/or alphanumeric characters that indicate the pitch of the aircraft 102 relative to a reference orientation for the body of the aircraft 102 using any convenient scale, where a pitch angle of zero degrees with respect to the reference orientation for the body of the aircraft 102 (i.e., zero pitch on pitch ladder scale 320) corresponds to the zero pitch reference line 318. In exemplary embodiments, the zero pitch reference line 318 is rendered in a conformal manner such that it moves (up and down) and rotates (clockwise and counterclockwise) within the primary flight display 302 in accordance with the current orientation (e.g., pitch, roll, and yaw) of the aircraft 102. In this regard, the rendering and display of zero pitch reference line 318 is influenced by the actual zero pitch orientation of the aircraft. It will be appreciated that the zero pitch reference line 318 generally corresponds to an artificial horizon line (e.g., an angle of zero degrees for the aircraft 102 nose to pitch up or down with respect to the real horizon parallel to the local earth surface). Thus, the zero pitch reference line 318 may be utilized to discern relative altitude and/or attitude of the terrain 304 with respect to the aircraft 102. Markings of pitch ladder scale 320 that appear above zero pitch reference line 318 correspond to positive pitch of the aircraft, and markings of pitch ladder scale 320 that appear below zero pitch reference line 318 correspond to negative pitch of the aircraft. The "intersection" of an aircraft reference symbol 306 with pitch ladder scale 320 represents the current pitch of the aircraft 102, as indicated on pitch ladder scale 320.

The roll scale 324 is realized as a graduated arc that is centered about a graphical indication 326 of a current bank angle of the aircraft 102 and includes a reference graphical indication 328 of a zero roll angle for the aircraft 102. Thus, the distance between the aircraft roll indicator 326 and the zero roll reference indicator 328 with respect to the roll scale 324 may be utilized to discern relative roll of the aircraft 102 with respect to the underlying terrain 304 depicted on the primary flight display 302. In this manner, the zero pitch reference line 318, the pitch ladder scale 320, and the roll scale 324 provide graphical indicia of the current attitude of the aircraft 102. The compass 322 is centered on a graphical representation of the aircraft 323 pointing upwards in a direction corresponding to the current heading of the aircraft 102, with the compass 322 rotating about the aircraft heading reference indicator 323 so that the current heading of the aircraft is positioned at the top of the compass 322 and aligned with the aircraft heading reference indicator 323 (e.g., "heading up").

Still referring to FIG. 3, in accordance with the evasion guidance display process 200 of FIG. 2, the processing system 108 renders or otherwise displays, on the primary flight display 302, a graphical representation of a target zone 340 for the aircraft 102 to fly to that was determined based on the output provided by the collision avoidance system 120. The target zone 340 graphically indicates that a horizontal evasive maneuver is recommended by the collision avoidance system 120 based on the horizontal distance 342 on the display device 104 between a center of the target zone 340 and the center of the aircraft reference symbol 306. In this regard, the on-screen distance 342 between the center of the target zone 340 and the aircraft reference symbol 306 corresponds to the amount of the horizontal adjustment required for the aircraft 102 to achieve a desired heading target, that is, the difference between the current aircraft heading and the target heading or the amount of roll (e.g., 15° to the left or counterclockwise) required to achieve the target heading from the current aircraft heading. In exemplary embodiments, the width of the target zone 340 corresponds to the width of the aircraft reference symbol 306 so that the aircraft reference symbol 306 fits horizontally within the target zone 340 when the current aircraft heading is aligned with the target aircraft heading. Similarly, the height of the target zone 340 corresponds to the height of the aircraft reference symbol 306 so that the aircraft reference symbol 306 fits vertically within the target zone 340 when the current aircraft pitch corresponds to any recommended vertical evasive maneuver. In exemplary embodiments, the target zone 340 is rendered using one or more visually distinguishable characteristics to convey desirability or safety, such as, for example, a green-colored outline, fill pattern, and/or the like. Additionally, in one or more embodiments, when an adjustment to the current aircraft state, the aircraft reference symbol 306 and the flight path reference symbol 312 are rendered using a different visually distinguishable characteristic to convey a potentially unsafe state, such as, for example, a red-colored outline, fill pattern, and/or the like.

Still referring to FIG. 3, the processing system 108 also renders or otherwise displays a horizontal avoidance zone 344 that emanates from the target zone 340 in a direction corresponding to the direction of the potential collision threat(s) identified by the collision avoidance system 120. In exemplary embodiments, the horizontal avoidance zone 344 is adjacent to the target zone 340 and trapezoidal in shape (alternatively referred to as goal post symbology), such that the vertical dimension (or height) of the horizontal avoidance zone 344 increases as the horizontal distance from the target zone 340 increases. The horizontal avoidance zone 344 is rendered using one or more visually distinguishable characteristics to convey undesirability or avoidance, such as, for example, a red-colored outline, fill pattern, and/or the like. It should be noted that FIGS. 3-4 depict a scenario where the collision avoidance system 120 has identified multiple potential horizontal collision threats, such that a second horizontal avoidance zone 346 is depicted on the primary flight display 302 emanating from the target zone 340 in a horizontal direction opposite of horizontal avoidance zone 344. That said, it should be appreciated that in various scenarios, a second horizontal avoidance zone 346 may not be present when potential collision threat(s) on the opposing side of the target zone 340 have not been detected.

FIG. 4 depicts an updated state of the primary flight display 402 that reflects the aircraft 102 rolling or banking towards the left from the initial aircraft orientation depicted in FIG. 3 to reduce the distance 342 between the target zone 340 and the aircraft reference symbol 306 and thereby achieve the targeted heading for the horizontal evasive maneuver. In this regard, the shape and orientation of the target zone 340 are maintained fixed as the orientation of the aircraft 102 changes to dynamically update the position of the target zone 340 with respect to the aircraft reference symbol 306. Once the horizontal center of the aircraft reference symbol 306 (e.g., the apex of the chevron) enters the target zone 340, the visually distinguishable characteristic(s) utilized to render the aircraft reference symbol 306 may be dynamically updated to reflect resolution of the potential collision threat(s). For example, the aircraft reference symbol 306 and the flight path reference symbol 312 may be dynamically updated from being rendered with a red fill pattern to a green fill pattern once the center of the aircraft reference symbol 306 enters the target zone 340. In this manner, a pilot is provided with a visual cue that the pilot can start to consider returning the aircraft 102 to a zero roll state.

FIG. 5 depicts an exemplary flight deck display 500 that includes graphical indicia for both horizontal and vertical evasion guidance depicted concurrently on a primary flight display 502. In this regard, FIG. 5 depicts a scenario where the output from the collision avoidance system 120 indicates that the aircraft 102 needs to climb in altitude from the current aircraft state while also horizontally adjusting the heading to the left of the current direction of travel, resulting in the target zone 540 being depicted above and to the left of the aircraft reference symbol 306. The horizontal distance 542 between the center of the target zone 540 and the center of the aircraft reference symbol 306 corresponds to the amount of horizontal adjustment recommended for the aircraft 102, while the vertical distance 543 between the center of the target zone 540 and the center of the aircraft reference symbol 306 corresponds to the amount of vertical adjustment recommended for the aircraft 102, that is, the targeted pitch for the aircraft 102 to achieve the vertical speed target in the desired direction. Trapezoidal horizontal and vertical avoidance zones 544, 546 emanate from the target zone 540 in the horizontal and vertical directions, respectively, to convey the spatial regions to be avoided by the aircraft 102. As described above, the avoidance zones 544, 546 may be rendered using a visually distinguishable characteristic to convey they should be avoided, with the aircraft reference symbol 306 and flight path reference symbol 312 also being rendered using a visually distinguishable characteristic to convey a problematic state of the aircraft, with the target zone 540 being rendered using a different visually distinguishable characteristic to convey safety or desirability. For example, the avoidance zones 544, 546, the aircraft reference symbol 306, and the flight path reference symbol 312 may be rendered in red in the embodiment shown in FIG. 5, while the target zone 540 is rendered using green. Thus, a pilot may immediately identify where and how the aircraft 102 should be flown from the current aircraft state to evade any potential collision threat(s) without having to make an independent determination, thereby saving potentially precious seconds.

Referring now to FIGS. 6-8, with continued reference to FIGS. 1-2, additionally or alternatively to providing graphical indicia of a horizontal evasive maneuver on a primary flight display with respect to the aircraft reference symbol, some embodiments may provide graphical indicia of a recommended horizontal adjustment using the roll scale of the primary flight display. In accordance with the evasion guidance display process 200 of FIG. 2, the processing system 108 renders or otherwise displays, on the primary flight display 602, a graphical representation of a target zone 640 on and overlying the roll scale 624 that indicates the targeted amount of roll adjustment for the aircraft 102 to achieve the desired horizontal adjustment to the aircraft heading determined based on the output provided by the collision avoidance system 120. The on-screen distance 642 measured with respect to the roll scale 624 between the center of the target zone 640 and the reference indicator 626 for the current bank angle of the aircraft 102 corresponds to the amount of the roll adjustment corresponding to the horizontal evasive maneuver recommended by the collision avoidance system 120. Additionally, the processing system 108 renders or otherwise displays avoidance zones 644, 646 that emanate from the target zone 640 to indicate roll angles that may not adequately mitigate the potential collision threat(s). In a similar manner as described above, the target zone 640 is rendered using one or more visually distinguishable characteristic(s) to convey safety or desirability, while the avoidance zones 644, 646 are rendered using rendered using one or more different visually distinguishable characteristic(s) to convey potentially problematic scenarios resulting from those roll angles. Additionally, the current aircraft roll indicator 626 may be rendered using a visually distinguishable characteristic to indicate a problematic aircraft state. For example, the current aircraft roll indicator 626 and the avoidance zones 644, 646 may be rendered using red, while the target zone 640 is rendered using green. The target zone 640 is centered at the roll angle recommended by the collision avoidance system 120, with the width of the target zone 640 being greater than or equal to the aircraft roll indicator 626 to encompass the aircraft roll indicator 626 upon achieving the desired roll adjustment, and the height of the target zone 640 being greater than or equal to the height of the tick marks on the roll scale 624 to avoid obscuring the roll scale 624.

In one or more embodiments, in connection with presentation of the roll target zone 640 and avoidance zones 644, 646, the processing system 108 renders or otherwise displays, on the primary flight display 602, a graphical indication 650 of the desired roll direction to ensure the aircraft 102 banks or rolls in the desired direction. The bank direction indicator 650 may improve situational awareness by avoiding or resolving any potential uncertainty about the direction in which the pilot should bank the aircraft 102. The bank direction indicator 650, the aircraft reference symbol 306, and the flight path reference symbol 312 may also be rendered using red or another visually distinguishable characteristic that indicates a problematic aircraft state.

FIG. 7 depicts an updated state of the primary flight display 602 after the aircraft 102 rolls to the left by a sufficient amount or duration to reduce the distance between the target zone 640 and the aircraft roll indicator 626 and bring the aircraft roll indicator 626 within the target zone 640. In this regard, as the aircraft 102 rolls in the desired direction, the difference between the current aircraft heading and the targeted heading decreases, which, in turn, decreases the amount of horizontal adjustment remaining, and thereby, decreases the remaining amount of roll adjustment for the aircraft 102 to achieve the targeted heading. Thus, as the aircraft 102 rolls or banks in the desired direction, the position of the target zone 640 with respect to the roll scale 624 dynamically updates to reduce the distance between the target zone 640 and a zero roll reference indicator 628.

Referring to FIGS. 7-8, once the aircraft roll indicator 626 enters the roll target zone 640, the aircraft roll indicator 626 is dynamically updated and rendered in a visually distinguishable characteristic that indicates the aircraft 102 has achieved a safe roll angle, for example, by updating the color of the aircraft roll indicator 626 from red in FIG. 6 to green in FIG. 7. FIG. 8 depicts an updated state of the primary flight display 602 relative to FIG. 7. As depicted in FIG. 8 relative to FIG. 7, as the current aircraft heading converges on the targeted heading, the target zone 640 approaches and encompasses the zero roll reference indicator 628 to provide a visual cue that conveys to the pilot when the roll of the aircraft 102 may be leveled off to zero once the targeted heading for collision avoidance is achieved. In this regard, alignment of the aircraft roll indicator 626 and the zero roll reference indicator 628 within the roll target zone 604 indicates the recommended horizontal evasive maneuver has been achieved.

Still referring to FIGS. 6-8, in the illustrated embodiment, a graphical indication 660 of the targeted heading for collision avoidance is provided on the compass 622 and rendered using a visually distinguishable characteristic (e.g., a red fill), with the visually distinguishable characteristic for the target heading indicator 660 dynamically updating (e.g., from a red fill to a green fill) once the aircraft 102 achieves a safe roll angle. FIG. 8 depicts the state of the target heading indicator 660 with respect to the compass 622 when the current heading of the aircraft 102 corresponds to the targeted heading. In a similar manner as described above, the target zone and target heading indicia 640, 660 may persist on the display 602 until the collision threat no longer exists, thereby indicating to the pilot when the aircraft 102 may resume flying in a different heading (e.g., to return to a previous lateral trajectory).

By virtue of the subject matter described herein, a pilot may be apprised of a recommended horizontal evasive maneuver in an intuitive manner that allows the pilot to react substantially immediately to execute the horizontal evasive maneuver without having to make an independent mental assessment or determination. In this regard, positive roll guidance is provided by the target fly-to zone that alleviates the need for the pilot to make a cognitive decision, rather than other approaches that passively depict where one or more potential threat(s) are coming from and require a pilot to analyze and comprehend the information, losing precious seconds. Additionally, avoidance zones convey spatial regions to be avoided, further facilitating the pilot executing the evasive maneuver.

For the sake of brevity, conventional techniques related to collision avoidance systems, navigation systems, inertial reference systems, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for displaying information on a display device associated with a vehicle, the method comprising:
    determining a horizontal adjustment for the vehicle based at least in part on an output from a collision avoidance system;
    displaying, on the display device, a target zone on a forward-looking perspective view display at a position on the forward-looking perspective view display offset from a reference position of a second graphical indication of a current orientation of the vehicle in a horizontal dimension, wherein a horizontal distance between the position of the target zone and the reference position of the second graphical indication in the horizontal dimension corresponds to the horizontal adjustment; and
    displaying, on the display device, an avoidance zone adjacent to the target zone on the forward-looking perspective view display, wherein a vertical dimension of the avoidance zone increases as a second horizontal distance from the target zone increases.

2. The method of claim 1, the output of the collision avoidance system comprising a target heading, wherein determining the horizontal adjustment comprises determining a roll adjustment based on a relationship between the target heading and a current heading of the vehicle.

3. The method of claim 2, wherein:
    the second graphical indication comprises a vehicle reference symbol; and
    the horizontal distance between the position of the target zone and the vehicle reference symbol corresponds to the roll adjustment from a current bank angle of the vehicle.

4. The method of claim 2, the second graphical indication comprising an ownship symbol on the forward-looking perspective view display, wherein the horizontal distance between the target zone and the ownship symbol in the horizontal dimension corresponds to the roll adjustment.

5. The method of claim 1, wherein:
    the vehicle comprises an aircraft;
    the forward-looking perspective view display comprises a primary flight display;
    the target zone is rendered on the primary flight display using a first visually distinguishable characteristic; and
    the avoidance zone is rendered on the primary flight display using a second visually distinguishable characteristic different from the first visually distinguishable characteristic.

6. The method of claim 1, further comprising dynamically updating the horizontal distance between the position of the target zone and the reference position of the second graphical indication on the forward-looking perspective view display in response to a change in an orientation of the vehicle.

7. A flight deck display for an aircraft, the flight deck display having rendered thereon a primary flight display comprising:
    an attitude indicator on a forward-looking perspective view display;
    an aircraft reference symbol with respect to the attitude indicator on the forward-looking perspective view display to indicate a current attitude of the aircraft;
    a graphical indication of a target zone for the aircraft on the forward-looking perspective view display, wherein the graphical indication of the target zone is offset from the aircraft reference symbol by a horizontal distance in a horizontal dimension corresponding to a horizontal adjustment for the aircraft determined based at least in part on a relationship between a current heading of the aircraft and an output from a collision avoidance system; and
    a second graphical indication of an avoidance zone on the forward-looking perspective view display adjacent to the target zone, wherein a vertical dimension of the second graphical indication of the avoidance zone increases as the horizontal distance from the graphical indication of the target zone increases.

8. The flight deck display of claim 7, wherein the avoidance zone emanates from the target zone in a horizontal direction corresponding to a potential collision threat indicated by the collision avoidance system.

9. The flight deck display of claim 7, wherein:
the output from the collision avoidance system comprises a target heading;
the horizontal adjustment comprises a roll adjustment determined based on a current aircraft speed and a difference between a current bank angle and a commanded bank angle to achieve the target heading; and
the horizontal distance dynamically decreases in response to the aircraft rolling towards the target zone.

10. The flight deck display of claim 7, wherein the horizontal distance between a center of the graphical indication of the target zone and a center of the aircraft reference symbol corresponds to the horizontal adjustment.

11. The flight deck display of claim 7, wherein a vertical distance between a center of the graphical indication of the target zone and a center of the aircraft reference symbol corresponds to a targeted pitch for the aircraft.

12. The flight deck display of claim 7, wherein the second graphical indication comprises trapezoidal zone symbology that converges at the target zone to emulate a forward-looking perspective view of the avoidance zone.

13. A non-transitory computer-readable medium having instructions stored thereon that are executable by a processing system to render a primary flight display on a display device coupled to the processing system, wherein the primary flight display comprises:
an attitude indicator on a forward-looking perspective view display;
an aircraft reference symbol with respect to the attitude indicator on the forward-looking perspective view display to indicate a current attitude of an aircraft;
a target zone on the forward-looking perspective view display, wherein the target zone is offset from the aircraft reference symbol by a horizontal distance in a horizontal dimension corresponding to a horizontal adjustment for the aircraft based at least in part on a relationship between a current heading of the aircraft and an output from a collision avoidance system; and
a horizontal avoidance zone on the forward-looking perspective view display adjacent to the target zone, wherein a vertical dimension of the horizontal avoidance zone increases as the horizontal distance from the target zone increases.

14. The non-transitory computer-readable medium of claim 13, wherein the horizontal distance between a center of the target zone and a center of the aircraft reference symbol corresponds to the horizontal adjustment.

15. The non-transitory computer-readable medium of claim 13, wherein a vertical distance between a center of the target zone and a center of the aircraft reference symbol corresponds to a targeted pitch for the aircraft.

16. The non-transitory computer-readable medium of claim 13, wherein the horizontal avoidance zone comprises trapezoidal zone symbology that converges at the target zone to emulate a forward-looking perspective view of an avoidance zone.

17. The non-transitory computer-readable medium of claim 13, wherein the instructions are executable by the processing system to determine a roll adjustment for the aircraft based on a current aircraft speed and a difference between a current bank angle and a commanded bank angle to achieve a target heading from a current aircraft heading, wherein the horizontal distance corresponds to the roll adjustment.

18. The non-transitory computer-readable medium of claim 13, wherein:
the output comprises a target aircraft heading output by the collision avoidance system; and
a width of the target zone corresponds to a width of the aircraft reference symbol so that the aircraft reference symbol fits horizontally within the target zone when a current aircraft heading is aligned with the target aircraft heading.

* * * * *